United States Patent [19]

Baird et al.

[11] Patent Number: 4,848,150

[45] Date of Patent: Jul. 18, 1989

[54] APPARATUS FOR MEASURING SMALL CHANGES IN LIQUID LEVEL IN A CONTAINER

[76] Inventors: William E. Baird, 55 Red Gate La., Cohasset, Mass. 02025; Peter J. Tolan, 30 Greenfield La., Scituate, Mass. 02066

[21] Appl. No.: 23,488

[22] Filed: Mar. 9, 1987

Related U.S. Application Data

[63] Continuation of Ser. No. 646,758, Sep. 4, 1984, abandoned.

[51] Int. Cl.⁴ .................. G01F 23/20; G01F 23/32
[52] U.S. Cl. .................................. 73/296; 73/49.2; 73/317; 177/210 FP
[58] Field of Search ............. 73/49.2, 290 V, 292, 73/313, 295, 314, 296, 298, 317, 305, 319, 306, 309, 311, 312; 250/357.1; 403/291, 354; 177/229, 255, 184, 187–189, 196, 210 FP, 207, 246; 405/53, 54; 116/228, 229; 340/621, 623–625, 605; 33/125 W; 324/207, 208

[56] References Cited

U.S. PATENT DOCUMENTS

| 299,758 | 6/1984 | Du Brul | 177/246 |
|---|---|---|---|
| 1,675,270 | 6/1928 | Hurst | 137/425 |
| 1,826,024 | 10/1931 | Roller | 177/211 |
| 2,739,806 | 3/1956 | Stelzer | 177/196 |
| 3,193,036 | 7/1965 | Meier | 177/252 |
| 3,508,623 | 4/1970 | Greenstein | 177/137 |
| 3,633,193 | 1/1972 | Milo | 340/244 A |
| 3,685,604 | 8/1972 | Smith et al. | 177/184 |
| 3,909,077 | 9/1975 | Leonarduzzi | 403/291 |
| 4,116,062 | 9/1978 | Reip | 73/321 |
| 4,117,684 | 10/1978 | Hendrix | 405/54 |
| 4,153,124 | 5/1979 | Knothe et al. | 177/248 |
| 4,153,126 | 5/1979 | Knothe et al. | 177/229 |
| 4,186,591 | 2/1980 | Mooney | 73/49.2 |
| 4,281,534 | 8/1981 | Hansel | 73/309 |
| 4,300,388 | 11/1981 | Hansel et al. | 73/309 |
| 4,317,495 | 3/1982 | Kuhnle et al. | 177/188 |
| 4,582,152 | 4/1986 | Gibbons | 177/229 |
| 4,596,952 | 6/1986 | Goff et al. | 324/207 |

FOREIGN PATENT DOCUMENTS 1371910 8/1964 France.
276474 10/1970 U.S.S.R.

Primary Examiner—William A. Cuchlinski, Jr.
Assistant Examiner—Patrick R. Scanlon
Attorney, Agent, or Firm—Henry M. Bissell

[57] ABSTRACT

A liquid level sensing apparatus for detecting leaks in storage tanks. A buoyancy member is at least partially immersed in the liquid, suspended from a pivoted, counterbalanced, parallelogram support arrangement with a radio frequency target sensing element for electrical readout of displacement. Two such apparatus are incorporated in a system with a provision for measuring a portion of the liquid of the tank in isolation from the remainder, in order to provide for temperature compensation.

19 Claims, 4 Drawing Sheets

APPARATUS FOR MEASURING SMALL CHANGES IN LIQUID LEVEL IN A CONTAINER

This is a continuation of application Ser. No. 646,758, filed Sept. 4, 1984, and now abandoned.

BACKGROUND OF THE INVENTION

In the testing of underground tanks such as gasoline tanks for leaks, it has heretofore been considered essential that the temperature of the contents of the tank be monitored during the period of the test. The coefficient of expansion of gasoline is such that a change in temperature of 1° F. of the contents of a 5000 gallon tank will cause a change in volume of about 3.25 gallons. Since the specifications of the National Fire Protection Association require that the rate of leaking from such a tank should not exceed 0.05 gallons per hour, it can be seen that if the test requires an hour or more to complete, the change in temperature during the test can give an erroneous result if this change is not taken into account. If the contents of the tank are decreasing in temperature, an erroneous indication of tank leaking may be given, whereas if the contents of the tank are increasing in temperature, the presence of an actual leak may be disguised by the increase in volume of the tank contents due to the temperature increase.

Another problem relating to temperature change is the fact that over a period of only an hour, the rate at which the temperature of the tank contents changes can vary substantially.

Various means for detecting such leaks and for compensating for the change in volume of the tank contents due to temperature change and evaporation during the test have been proposed. For example, U.S. Pat. No. 4,186,591 issued Feb. 5, 1980 shows a tank testing system having means for simultaneously monitoring the temperature and the level of the tank liquid. U.S. Pat. No. 4,300,388 issued Nov. 17, 1981 shows a tank testing device which utilizes a buoyant member suspended in the tank liquid, with means for compensating for changes in liquid level due to vaporization of the liquid and temperature changes. Obviously such compensation is necessary only if the test must be carried out over a considerable period of time. The above mentioned U.S. Pat. No. 4,300,388 utilizes a laboratory balance for supporting the buoyancy member to detect the change in level of the liquid, however it has been found that ordinary chemical or laboratory balances are not entirely satisfactory for such tank testing for a number of reasons.

In the case of a tank having a leak of the minimum amount required to be detected, (0.05 gallons per hour) the rate of change of the liquid level in the 4" fill pipe of the tank is only about 0.017 inches per minute. Although such scales are capable of accurately measuring small weight differences (which often requires that the beam be physically moved to the lower limit of its travel and then released to insure that the beam comes accurately to the balanced position), such scales are not suitable for measuring small increments of movement of a device suspended from the scale beam, since the scale is supported on a so-called knife edge. However such "knife-edge" does not actually provide an infinitely thin line on which the beam rests, but actually provides a narrow elongated surface having a finite width on which the beam pivots. This surface is also not absolutely regular, and therefore will cause a slight resistance to the starting motion of the beam, particularly when a very small force is applied very slowly and gradually to the beam. When the force reaches a sufficient amount, the beam will move suddenly, and will move slightly further than a distance which is proportional to the applied force.

This effect is sometimes referred to in the industry as "stiction", and has little consequence when the scale is used for measuring weight, since the beam can, if necessary, be moved by hand to a stop as described above, so that the force tending to restore the scales to the balanced position is relatively large. However, when the scale is used for detecting small changes in liquid level that occur over a period of time, with the beam position being accurately detected electronically, and with a chart recorder read-out of beam position, this erratic motion can cause wide fluctuations of the chart recorder pen which are considerably greater than the change due to liquid level change alone, and therefore require an extended test period to determine the "line of best fit" on the chart for actual rate of change of the liquid level.

SUMMARY OF THE INVENTION

This invention provides apparatus and method for measuring the change in level of liquid in a container, and is particularly adapted for use in detecting leaks in underground storage tanks.

The apparatus comprises a parallelogram structure mounted on a fixed base, with a stationary end and a movable end which is capable of vertical movement which is absolutely proportional to the force applied. The movable end has a support arm for a buoyancy device to be suspended so as to be partially submerged in the liquid, and also carries an RF target plate. A radio frequency generator is mounted on the fixed base and projects a low level RF signal, which generates eddy currents in the target plate, which reduces the impedance of the sensor. This change in impedance is directly proportional to the distance between the target plate and the RF generator, and can provide a voltage output, the change in which can be measured to determine the change in position of the target plate.

The parallelogram pivots are not rotating bearings, but are flexure connectors joining the parallelogram members so that no surfaces of the members are in contact with each other. The motion of the parallelogram is therefore essentially frictionless and is accurately proportional to the force applied through the limited distance the support arm must move to accomodate changes in liquid level, even at the extremely slow rate of change of liquid level when a small leak is present. Suitable damping means is also provided between the parallelogram and its support to reduce the effect of ground vibrations and the effect of wind across the fill pipe of the tank being tested. In a preferred embodiment of the invention, the scales are mounted onto a support which has a suitable fitting to enable it to be mounted directly onto the fill pipe of the tank, to prevent vibrations of the surrounding ground from reaching the scales.

It has been found that the apparatus described herein is easily capable of accurately providing a uniform output signal during extremely low rates of change of liquid level, and that an accurate indication of level change can be obtained in a test period short enough that in most cases, any change in liquid level due to temperature change or evaporation during the period of the test can be ignored. The apparatus is also accurate and sensitive enough to detect a change in the rate of leaking in situations where the leak is in the piping above the tank.

DESCRIPTION OF THE ILLUSTRATED EMBODIMENT

Figure 1:
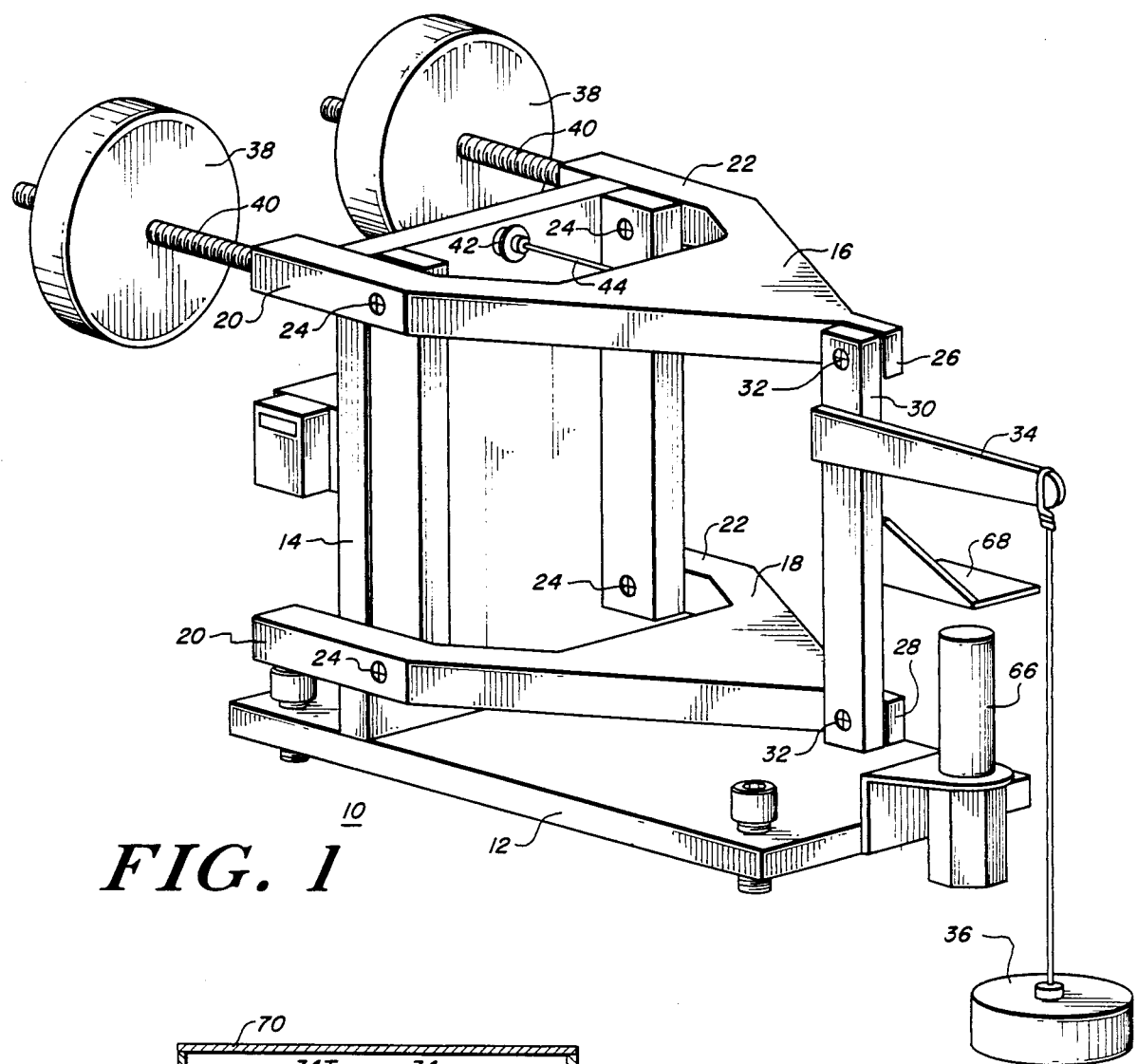
FIG. 1 is a perspective view of a liquid level testing apparatus embodying the features of the invention.

Referring to the drawing, there is illustrated a liquid level testing apparatus 10 which is particularly adapted for detecting small changes in liquid level in a storage tank.

The illustrated embodiment of the apparatus comprises a support plate 12 on which is mounted a beam support member 14 which extends vertically from the support plate 12 and supports a movable beam which comprises upper and lower beam members 16 and 18. Each beam support member has rearwardly extending legs 20 and 22 which are spaced apart a suitable distance to enable them to straddle the beam support member 14 and are attached thereto at pivot points 24 in a manner to be described.

The forward ends 26 and 28 of the upper and lower beam members 16 and 18 are joined by a vertically extending member 30, which is parallel to the beam support member 14, at pivot points 32.

Extending forwardly from the connecting member 30 is a support arm 34 for supporting a buoyancy member 36.

The beam support member 14, the beam members 16 and 18, and the connecting member 30 form a parallelogram, so that movement of the beam members 16 and 18 about the pivot points causes vertical motion of the support arm 34. The amount of vertical motion of the buoyancy member 36 is therefore independent of the position on the arm 34 to which the buoyancy member is attached.

To balance the beam to a desired starting position, and to compensate for the weight of the buoyancy member 36, a pair of counter-weights 38 are mounted on threaded members 40 extending rearwardly from the upper beam member 16.

To damp out oscillations of the beam, a self-contained damping device 42 is mounted on the beam support member 14, and has an operating rod 44 extending therefrom with the remote end thereof projecting into a suitable aperture in the upper beam member 16, so that vertical motion of the beam causes pivoting of the operating rod.

The apparatus 10 is primarily intended for detecting small changes in the level of liquid in a storage tank by detecting the change in buoyancy of the member 36 partially suspended in the liquid by measuring the change in position of the beam over a period of time. If a leak exists in the tank, the liquid level will drop, so that the buoyancy member will also tend to drop, moving the support arm downwardly.

As stated hereinbefore, such movement is at an extremely slow rate, and therefore the pivot points must be essentially frictionless. Therefore the mounting of the upper and lower beam members to the beam support member, at the pivot points 24, and the mounting of the connecting member 30 to the forward ends of the beam members at pivot points 32 must be essentially frictionless.

Figure 4:
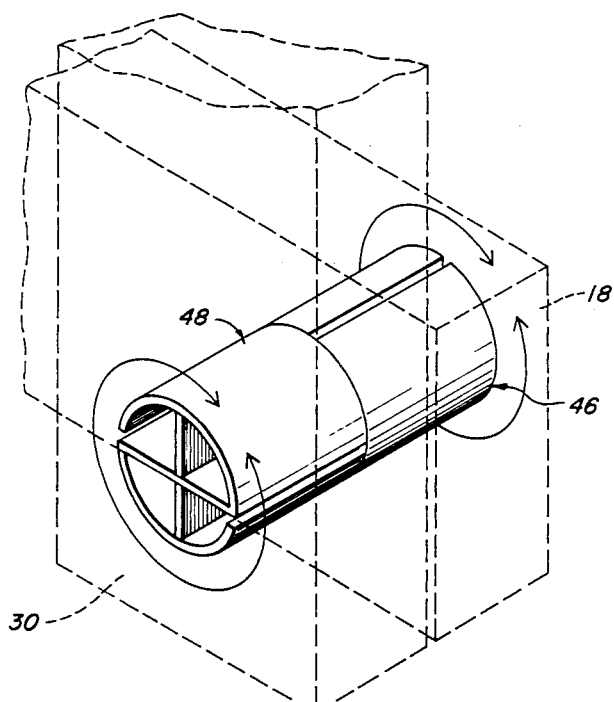
FIG. 4 is an enlarged perspective view of one of the pivots of the apparatus of FIG. 1.
Figure 5:
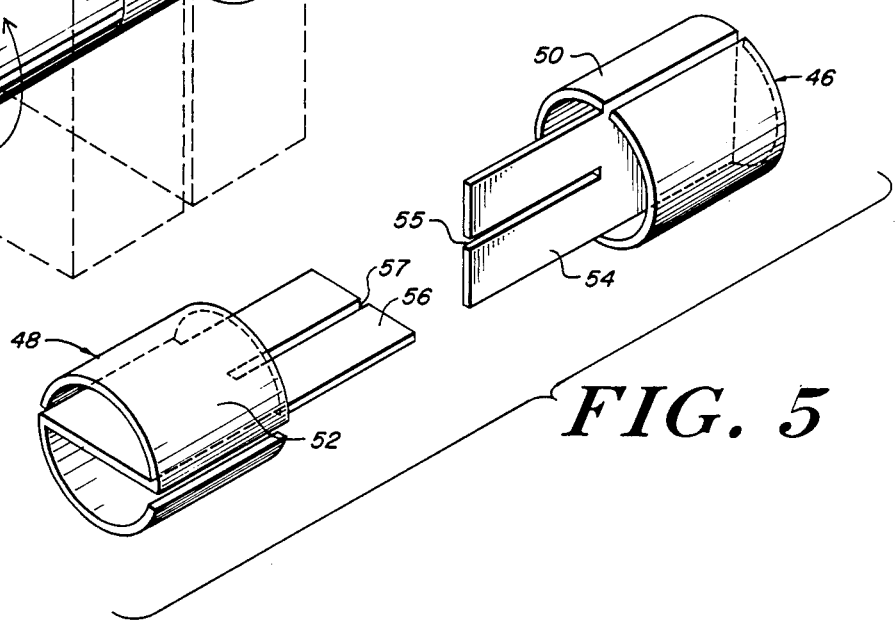
FIG. 5 is an exploded view of the flexible pivot member of FIG. 4

For this purpose the members comprising the parallelogram are spaced laterally from each other at the pivot points and are joined by so-called flexural pivots (see FIGS. 4 and 5) which comprise two co-axial end portions 46 and 48 which are press fitted into suitable apertures in adjacent spaced surfaces of the members (such as the forward end 28 of the lower beam member and the lower end of the connecting member 30) so that one end portion is fixedly retained in each member.

Each end portion comprises a retaining portion (50 and 52) which is curved to conform to the inner surface of the end portion and is resiliently retained therein, and a flexible tongue (54 and 56) which extends into the interior of the other end portion and straddles the rear end of the other tongue inside the retaining portion via respective slots 55, 57.

The portions 46, 48 are therefore joined only by said flexible tongues 54, 56 and are at no point in sliding, rolling, or pivoting contact, as is the case with the ordinary chemical or laboratory balance. Rotation of one end portion in relation to the other end portion causes flexing of said tongues and within the design limits of the flexural members, the angular displacement is accurately proportional to the force applied by the buoyancy member, even at extremely low forces.

A force applied to the support arm 34 is therefore resisted by the flexible members 54, 60 and the motion of the arm and the parallelogram is accurately proportional to the force applied to the support arm.

To measure the movement of the support arm from a predetermined position with the required accuracy, an electronic non-contact measuring device is provided. In the illustrated embodiment this comprises a low-level RF field generator 66 mounted on the support 12, and a target plate 68 mounted on the movable end of the parallelogram. The RF generator 66 generates a low level RF field that generates eddy currents in the target 68, which eddy currents reduce the impedance of the sensor. This reduction in impedance is utilized by suitable electronic circuitry to produce a voltage that is linearly proportional to the distance of the sensor face to the surface of the target. Such devices are commercially available, and are capable of providing a 200 millivolt change in voltage with a change in distance to the target plate of .001 inch.

The output of the sensor may be fed to a chart recorder to provide a continuous read-out of the motion of the target plate, (corresponding to the change in level of the liquid in the storage tank,) and to thereby provide, over a period of time, a graph showing the change in level of the liquid in the tank.

Figure 6:
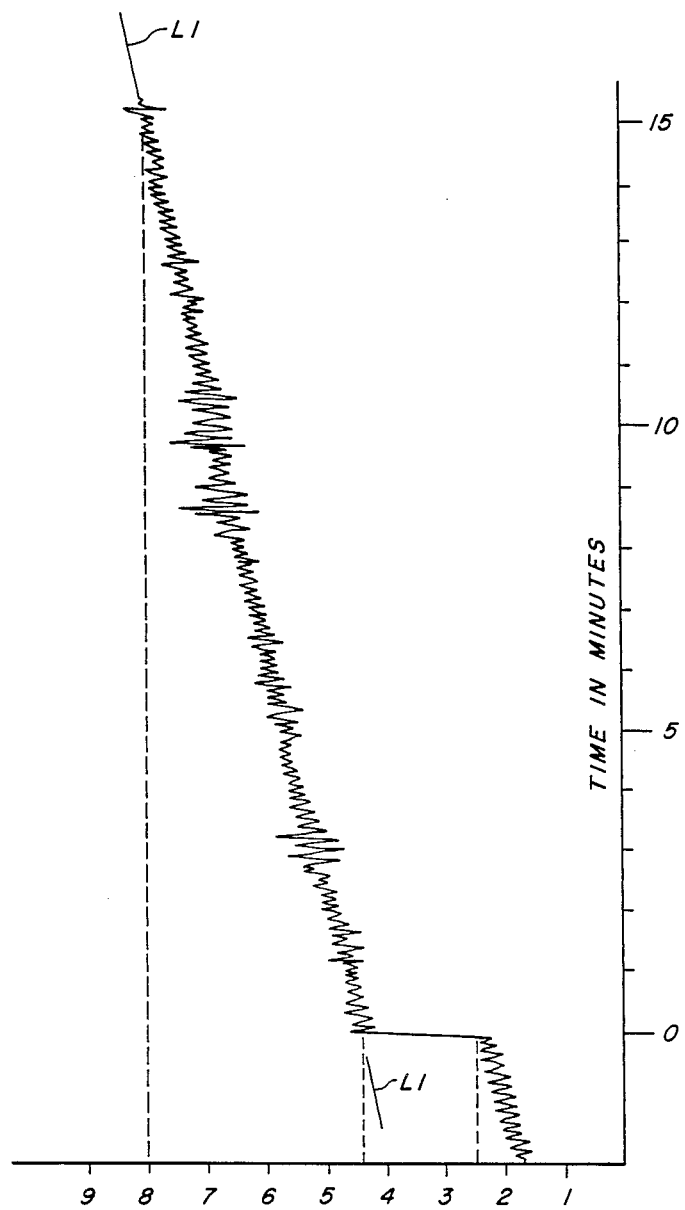
FIG. 6 is a graph illustrating the drop of liquid level in the tank fill pipe over a period of time as measured by the output of the apparatus of FIG. 1 applied to a chart recorder.
Figure 7:
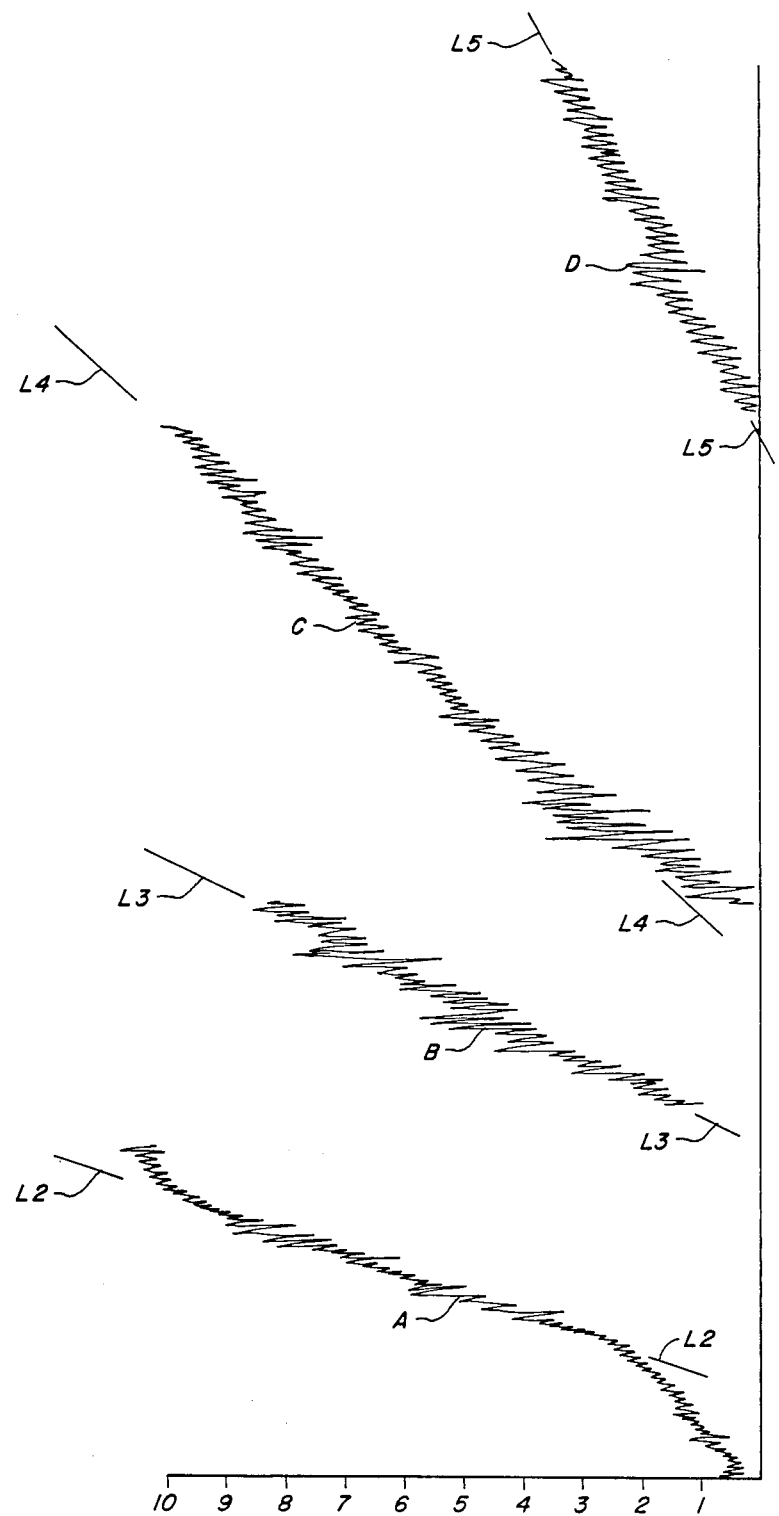
FIG. 7 is another graph illustrating the change in rate of leakage of a tank in which the leak is in the piping above the tank.

The initial portion of each graph of FIGS. 6 and 7 shows oscillations due to the disturbance in the tank caused by the insertion of the tube T and the buoyancy member 36. After this initial oscillation has subsided, a measured quantity of liquid previously taken from the tank (in this case, 50 ml.) is added to the fill pipe to calibrate the recorder, which results in a rise in level of the liquid in the tube corresponding to 12 divisions on the chart. The relationship between change of volume in the fill pipe and any other piping above the surface of the tank and the chart divisions is therefore established for this particular tank installation.

As the test progresses, it is seen that oscillations occur due to ground vibrations and the effect of wind on the level of fluid in the tank fill pipe, however, within 15 minutes, a line of best fit (L) can be established, indicating a rate of drop of level in the fill pipe of about 0.12 inch in 15 minutes, indicating a leak of about 90 cc per 15 minutes, equivalent to about 0.024 gallons per hour, or less than half of the amount of leakage permitted by the NFPA specification.

Figure 2:
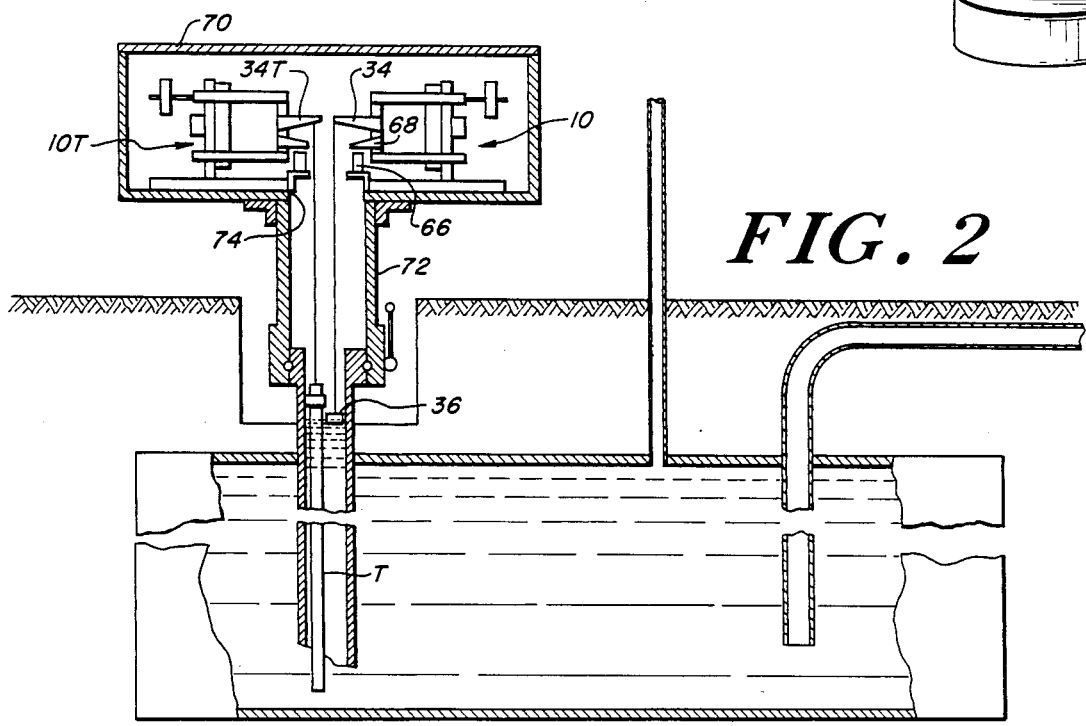
FIG. 2 is a view in section, partly in elevation, illustrating the leak tester of FIG. 1 mounted onto the fill pipe of an underground tank in position for performing a leak test on the tank.
Figure 3:
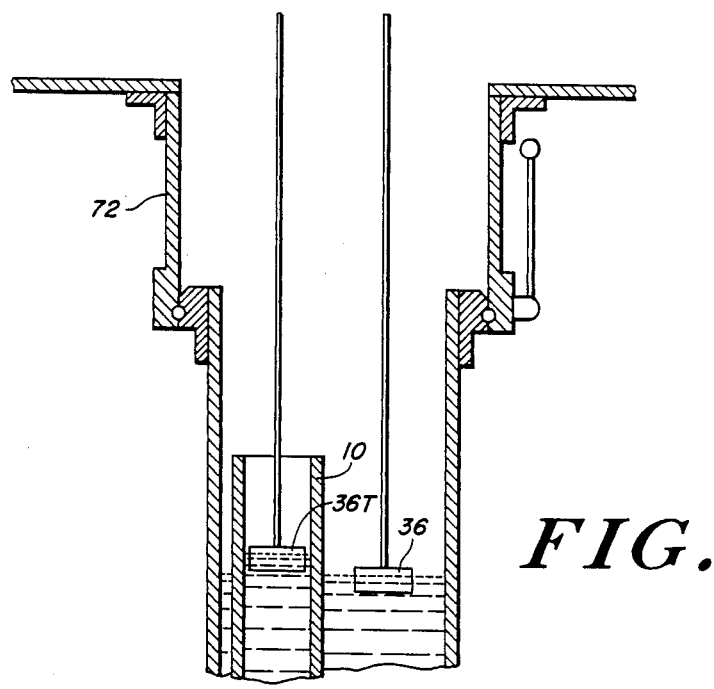
FIG. 3 is an enlarged view of the mounting assembly by which the testing apparatus is mounted onto the fill pipe.

If desired, the change in volume of the liquid in the tank due to temperature change may be monitored by providing a tube T full of liquid from the tank. The tube T has an open top end and extends from substantially the bottom of the tank into the fill pipe (see FIG. 2). A second scales 10T may be provided, which may be identical to scales 10, with a buoyancy member 36T suspended from the support arm 34T into the liquid in the tube T, to detect changes in the level of liquid in the tube T, which will be caused solely by the change in temperature of the tank contents.

If the rate of change of temperature of the tank contents were constant, the same results should be obtained regardless of the duration of the test. However, it has been found that if the temperature is monitored over a period of an hour or more, it is found that the rate of change of level in the temperature test pipe can vary considerably in either direction. Therefore a test method that requires monitoring the tank level for an extended period of time, and measuring the difference in fill pipe level that occurs over that period of time can be considerably in error due to changes in the rate of temperature change during the test.

It has been found that the apparatus described herein is easily capable of an accurate indication of a change in liquid level caused by a leak of 0.05 gallons per hour (11.55 cubic inches, or about 190 cc per hour) which is the maximum rate of leakage permitted under the NFPA regulations.

This rate of leakage causes a drop in fill pipe level of about 0.25 inch in 15 minutes. However the equipment described herein is easily capable of detecting even smaller rates of change of liquid level, and can, without difficulty a detect a change in liquid level of as little as 0.025 inch per 15 minutes, equivalent to a leak of only 0.0065 gallons per hour, or 4.7 cc per 15 minutes.

Therefore by providing an apparatus that give an accurate test of liquid level in the fill pipe in 15 minutes or less, any effects due to temperature change or evaporation can be ignored.

However, if desired, such as in situations where regulations require that the change in volume due to temperature change during the test be monitored and recorded, the output of the second scale 10T may also be applied to the chart recorder, and the percentage change of the liquid in the tube T applied to the total volume in the tank to obtain the change in fill pipe level due to temperature alone. However in most cases it has been found that the rate of change of tank temperature is so slow that it is unnecessary to take into account the temperature change of the tank contents during the short period of the test.

It has been found that the accuracy and sensivity of the apparatus enables it, in some cases, to indicate the position of the leak. For example, FIG. 7 is a graph of a leak in which the rate of leaking decreases as the test proceeds. (The four sections, A, B, C, and D of the graph are continuations of the same test, since when the chart pen reaches the left edge of the chart paper, it is reset by electrical biasing to the right edge of paper). Portion B of the graph has a slope in relation to vertical, or zero slope which is less than the slope of the previous portion A, and portion C has a slope less than that of B, with portion D having a slope approaching zero. It has been found that this phenomena occurs when the leak is at some point above the tank itself, such as at the junction of the fill pipe with the tank or in the piping to the pump or to the vent pipe. The rate of leaking decreases as the level of the liquid in these pipes approaches the position of the leak, thereby decreasing the head of fluid and reducing the rate of the leak.

This ability of the apparatus to detect the fact that the leak is in the piping or connections above the tank is especially valuable, since it eliminates the need of digging up the entire tank to find the leak.

In a preferred embodiment of the invention, the scales 10 and 10T may be mounted in a suitable enclosure 70, which has a support column 72 on the bottom with a fitting on the bottom end thereof which is similar to the fitting on the end of a fill hose, so that the enclosure may be mounted directly onto the fill pipe, without contact of the enclosure with the surrounding surface (usually concrete or asphalt) so that the scales are isolated from receiving vibrations directly from the surrounding surface of the earth. A suitable aperture 74 is provided in the bottom of the enclosure for allowing the bouyancy members and supporting line to hang from the support arms of the scales into the fill pipe. The enclosure also assists in reducing the effect of wind on the apparatus.

Since certain changes apparent to one skilled in the art may be made in the herein described embodiments of the invention without departing from the scope thereof, it is intended that all matter contained herein be interpreted in an illustrative and not a limiting sense.

We claim:

1. Apparatus for determining small changes in the level of liquid in a container comprising:
   a frame including a rigidly mounted, vertical support member;
   a pivoting mechanism including a pair of horizontal members pivotably joined to a pair of vertical members in a generally parallelogram configuration, the vertical support member of the frame constituting a first one of the pair of vertical members of the pivoting mechanism;
   at least one of said horizontal members comprising a Y-shaped yoke pivotably mounted at two points to a pair of spaced apart support elements of the vertical support member;
   a buoyancy member;
   vertically movable means for supporting the buoyancy member in at least partial immersion in the liquid within the container, said supporting means being vertically movable in response to minute changes of buoyant force on the buoyancy member resulting from minute changes in liquid level;

means for balancing the buoyancy member at a selected position in preparation for taking measurements of liquid level to determine changes in excess of a specified rate; and flexing means coupling one of the horizontal members to the vertical support member of the frame for damping oscillations of the pivoting mechanism.

2. The apparatus of claim 1 wherein the at least one horizontal member comprising a Y-shaped yoke is positioned above the other horizontal member of said pair.

3. The apparatus of claim 2 wherein the Y-shaped yoke comprises a pair of rearwardly extending legs which straddle the spaced apart support elements of the vertical support member and extend past the vertical support member.

4. The apparatus of claim 3 wherein said rearwardly extending legs include threaded extended portions and wherein the balancing means include a pair of weights, each of which is threaded onto a corresponding threaded extended portion, the weights being movable along the threaded portions by rotation thereon to balance the buoyancy member at said selected position.

5. The apparatus of claim 3 wherein the remaining horizontal member of said pair also comprises a Y-shaped yoke pivotably mounted at two points to said pair of spaced apart support elements, the pivotable mounting points of the lower horizontal member being vertically aligned along the spaced apart support elements with corresponding ones of the pivotable mounting points for the upper horizontal member.

6. The apparatus of claim 5 wherein the Y-shaped yoke of the lower horizontal member comprises a pair of rearwardly extending legs which straddle the spaced apart support elements of the vertical support member and extend past the vertical support member.

7. The apparatus of claim 6 wherein the remaining vertical member of the pivoting mechanism comprises a single bar pivotably mounted at opposite ends thereof to corresponding ends of the horizontal members which are remote from the pivotable mounting to the spaced apart support elements of the vertical support member of the frame.

8. The apparatus of claim 7 wherein said frame further includes a horizontal plate rigidly attached to said rigidly mounted vertical support member, said frame having a longitudinal axis extending generally centrally thereof and orthogonal to the vertical support member of the frame.

9. The apparatus of claim 8 wherein the vertically movable means include an arm extending orthogonally to the vertical support bar and generally outward therefrom along the longitudinal axis of the frame.

10. The apparatus of claim 8 wherein the frame includes at least one adjustable levelling member threadably coupled to the horizontal plate for levelling the frame.

11. The apparatus of claim 9 wherein the vertical movable means include a support line coupled between the buoyancy member and said arm for supporting the buoyancy member therefrom.

12. The apparatus of claim 11 wherein the upper end of said line is attached to an outer end of said arm.

13. The apparatus of claim 9 further including measuring means for sensing vertical movement of the horizontal arm.

14. The apparatus of claim 13 wherein the measuring means comprise a reference element affixed to said single bar to move therewith and a transducer mounted to the frame adjacent the reference element to sense movement of said reference element.

15. The apparatus of claim 14 wherein said transducer comprises an RF field generator within a transducer housing mounted to the frame, said transducer having a flat end surface adjacent said reference element.

16. The apparatus of claim 1 further including a plurality of resilient pivot members for pivotably mounting the horizontal and vertical members of the parallelogram configuration, said resilient members comprising a pair of mating resilient elements, each resilient element having a curved portion for fitting within a round mounting hole and a centrally positioned flat extending portion slotted to receive the corresponding portion of the other resilient element of said pair to permit limited rotational movement of one member of the pivoted mechanism relative to the other member of the pivoted mechanism having a common resilient coupling therewith by virtue of the flexibility of said flat portions.

17. Apparatus for determining small changes in the level of liquid in a container comprising:

a frame including a rigidly mounted, vertical support member;

a pivoting mechanism including a pair of horizontal members pivotably joined to a pair of vertical members in a generally parallelogram configuration, the vertical support member of the frame constituting a first one of the pair of vertical members of the pivoting mechanism;

at least one of said horizontal members comprising a Y-shaped yoke pivotably mounted at two points to a pair of spaced apart support elements of the vertical support member;

a buoyancy member;

vertically movable means for supporting the buoyancy member in at least partial immersion in the liquid within the container, said supporting means being vertically movable in response to minute changes of buoyant force on the buoyancy member resulting from minute changes in liquid level;

means for balancing the buoyancy member at a selected position in preparation for taking measurements of liquid level to determine changes in excess of a specified rate; and a damping device mounted on the vertical support member in line with said at least one horizontal member comprising a Y-shaped yoke at a location generally centrally located between said spaced apart support elements and having an elongated member extending to be coupled with said at least one horizontal member to damp out oscillations of the pivoting mechanism.

18. The apparatus of claim 17 wherein said damping device further includes a button-shaped first end adjacent said vertical support member to provide a resilient mounting to said elongated member.

19. The apparatus of claim 18 wherein said elongated member comprises a thin rod extending from the button-shaped first end into an aperture in that surface of the Y-shaped yoke facing toward the vertical support member.

* * * * *